(12) United States Patent
Kaburlasos et al.

(10) Patent No.: US 8,607,083 B2
(45) Date of Patent: Dec. 10, 2013

(54) METHOD AND APPARATUS FOR INTERRUPT POWER MANAGEMENT

(75) Inventors: Nikos Kaburlasos, Lincoln, CA (US); Guy M Therien, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 136 days.

(21) Appl. No.: 12/752,256

(22) Filed: Apr. 1, 2010

(65) Prior Publication Data

US 2011/0246804 A1 Oct. 6, 2011

(51) Int. Cl.
*G06F 1/32* (2006.01)
*G06F 1/00* (2006.01)
*G06F 15/16* (2006.01)
*G06F 9/46* (2006.01)

(52) U.S. Cl.
USPC ........... 713/320; 713/300; 709/201; 718/104; 718/105

(58) Field of Classification Search
None
See application file for complete search history.

(56) References Cited

U.S. PATENT DOCUMENTS

| | | | |
|---|---|---|---|
| 5,617,502 A * | 4/1997 | Ort et al. | 386/211 |
| 7,017,060 B2 * | 3/2006 | Therien et al. | 713/323 |
| 2002/0083169 A1 * | 6/2002 | Aki et al. | 709/224 |
| 2005/0108717 A1 | 5/2005 | Hong et al. | |
| 2005/0228967 A1 | 10/2005 | Hirairi | |
| 2008/0091974 A1 | 4/2008 | Nakashima | |
| 2009/0187909 A1 | 7/2009 | Russell et al. | |
| 2010/0058086 A1 | 3/2010 | Lee | |
| 2010/0077185 A1 | 3/2010 | Gopalan et al. | |
| 2010/0174923 A1 * | 7/2010 | Houlihan et al. | 713/300 |
| 2010/0332876 A1 * | 12/2010 | Fields et al. | 713/323 |
| 2011/0078469 A1 * | 3/2011 | Therien | 713/320 |
| 2011/0148890 A1 * | 6/2011 | Kaburlasos et al. | 345/520 |

FOREIGN PATENT DOCUMENTS

| | | |
|---|---|---|
| CN | 101436098 | 5/2009 |
| EP | 2182441 | 5/2010 |
| JP | 2003-281112 | 10/2003 |
| JP | 200734672 | 8/2008 |
| JP | 200832052 | 8/2009 |
| WO | 2008126419 | 10/2008 |
| WO | WO2009120427 | 10/2009 |

OTHER PUBLICATIONS

Office Action received for Japanese Patent Application No. 2011-077275, mailed Feb. 5, 2013, 6 pages including 3 pages English translation.
Office Action received for Chinese Patent Application No. 201110096121.7, mailed May 27, 2013, 16 pages including 5 pages English translation.
Office Action received for Japanese Patent Application No. 2011-077275, mailed Jun. 4, 2013, 6 pages including 3 pages English translation.

\* cited by examiner

*Primary Examiner* — Ji H Bae
(74) *Attorney, Agent, or Firm* — Kacvinsky Daisak PLLC

(57) ABSTRACT

Embodiments of a method and apparatus are described for low power operation of a multi-core processing system. An apparatus may comprise, for example, an affinitization management module operative to detect a media application operative to execute on one or more of a plurality of processor cores of a multi-core processor, dynamically select a subset of processor cores of the multi-core processor, and affinitize the media application to execute on the subset of processor cores. Other embodiments are described and claimed.

27 Claims, 4 Drawing Sheets

METHOD AND APPARATUS FOR INTERRUPT POWER MANAGEMENT

BACKGROUND

The performance of modern computing systems has increased rapidly in recent years. One particular area in which performance has evolved is processor technology. Many processors in computing system today include a plurality of cores. Another area in which performance has evolved is media playback. Many modern computing systems are capable of playing back a variety of media types, including high definition media. The increase in processing power provided by multi-core processors and the increased processing demands associated with media playback has resulted in increased power consumption for computing systems that continue to decrease in size. As the processing power and the number of cores in multi-core processors continue to increase, reductions in power consumption become important considerations. As a result, it is desirable to adapt multi-core processors, when possible, to conserve power. Consequently, there exists a substantial need for techniques to manage power consumption for multi-core processor systems.

DETAILED DESCRIPTION

Figure 1:
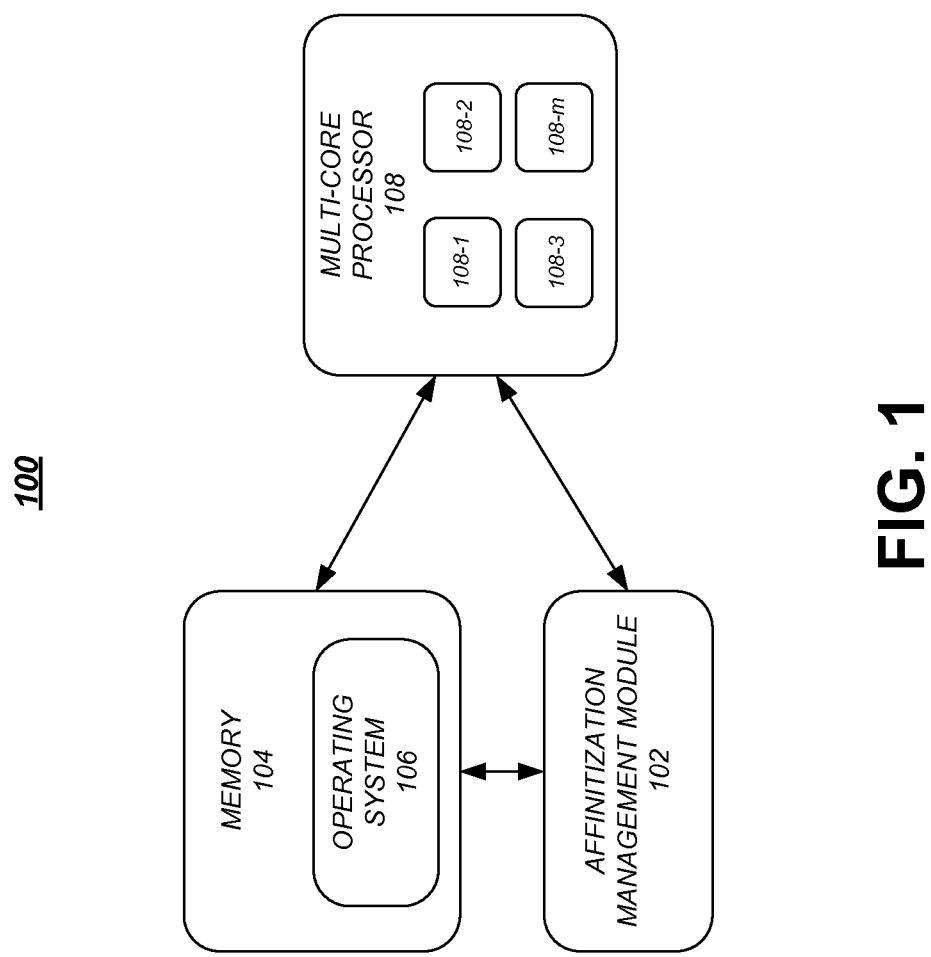
FIG. 1 illustrates one embodiment of an apparatus.

The embodiments are generally directed to techniques designed to reduce power consumption in computing systems utilizing multi-core processors. Various embodiments provide techniques that include an affinitization management module to detect a media application operative to execute on one or more of a plurality of processor cores of a multi-core processor, dynamically select a subset of processor cores of the multi-core processor, and affinitize the media application to execute on the subset of processor cores. Other embodiments are described and claimed.

With the progression over time toward the use of multi-core processors, power consumption when running or executing active workloads has steadily risen. One particular area which results in relatively high power consumption is media playback. For example, playback of a high definition (HD) DVD movie on a computing system having a multi-core processor consumes relatively large amounts of power. While certain embodiments described herein refer to media content, media playback and/or HD media content and playback, it should be understood that the embodiments are not limited in this context. The embodiments described herein are applicable to any number of application and content types, including any context type that includes separate data streams that require synchronization and/or include interrupts, time stamps or other synchronization details.

In various embodiments, power consumption during media playback may be attributed mainly to four types of processing that a processor performs. For example, the processor may execute Tamper Resistance Software (TRS) that a media application employs in order to protect encryption keys for media content in some embodiments. In various embodiments, the processor may also process video associated with the media playback and decode audio associated with the media playback. In various embodiments, audio/video (A/V) synchronization may also be required. For example, a processor may be required to process periodic media interrupts utilized by a media application to synchronize the video and audio data streams. This repeated periodic processing of media interrupts may lead to increased power consumption in some embodiments.

In conventional computing systems, media applications may implement the A/V synchronization by programming a timer to generate periodic interrupts. In some embodiments, the interrupts may occur as often as once per 1 ms. Each time the interrupt occurs, the media application checks timestamps in the video and audio packets and may process a next group of video and audio packets, ensuring that the two streams remain synchronized. An interrupt generated every 1 ms may be used to ensure tighter synchronization between the video and audio data streams in some embodiments. In conventional systems, each interrupt may be propagated to each available processor core. In some embodiments, when a core receives an interrupt, it executes an interrupt dispatcher, which may add to processor utilization. In various embodiments, the higher the number of cores in a processor, the higher the total interrupt rate (on all processor cores) and, therefore, the higher the processor utilization overhead required to processes the A/V synchronization interrupts.

Conventional methods for reducing utilization overhead and power consumption during media playback may include extending the interrupt period from, for example, 1 ms to 10 ms and possibly by also enabling separate audio interrupts for the audio data stream. In some embodiments, this may reduce the processor interrupt overhead but it may also, however, negatively impact the synchronization of the audio and video data streams and in turn reduce the quality of the playback and the user experience in viewing the media content. As such, there exists no efficient means today to limit power consumption of multi-core processors that are executing active workloads, such as running or executing a media application. Consequently, various embodiments described herein provide an efficient means to reduce multi-core processor power consumption when executing active workloads, without affecting media or other stream synchronization and ultimately, the user experience.

In various embodiments, an alternative, application-independent approach to reducing the processor utilization overhead and power consumption associated with A/V synchronization interrupts may include dynamically affinitizing a media application to execute on a smaller number of processor cores, thereby reducing the number of media interrupts that propagate to the different processor cores. Media applications typically do not need to be executed on every single core which is available on the system, so affinitizing the application on a smaller number of cores may not impact performance, on one hand, and reduces the total interrupt rate and processor utilization, on the other hand. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiment of an apparatus. FIG. 1 illustrates a block diagram of an apparatus 100. Apparatus 100 may comprise a computing system in some embodiments. As shown in FIG. 1, apparatus 100 comprises multiple elements, such as affinitization management module 102, memory 104, operating system 106 and multi-core processor 108 including cores 108-1-*m*. The embodiments, however, are not limited to the elements or the configuration shown in this figure.

In various embodiments, multi-core processor 108 may comprise a central processing unit comprising one or more processor cores 108-1-*m*. The processor 108 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor cores 108-1-*m* may comprise logical and/or virtual processor cores. Each logical processor core 108-1-*m* may include one or more virtual processor cores in some embodiments. For example, each processor core 108-1-*m* may include two virtual cores resulting in a total of eight available cores for multi-core processor 108. Other embodiments are described and claimed.

In various embodiments, memory 104 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Operating system (OS) 106 may comprise an interface between various hardware components of apparatus 100 and a user in some embodiments. In various embodiments, OS 106 may be responsible for the management and coordination of activities and the sharing of the resources of the computing system 100. In some embodiments, OS 106 may act as a host for a variety of computing applications run or execute on computing system 100, such as a media application, for example. OS 106 may comprise a Windows® operating system by Microsoft Corporation® of Redmond, Wash. in some embodiments. Other embodiments are described and claimed.

In various embodiments, affinitization management module 102 may comprise a software driver or application to manage power for computing system 100. In some embodiments, affinitization management module 102 may comprise a software driver running under OS 106 that controls entry into and management of a specific power plan, such as media processor core affinitization plan for example. The media processor core affinitization plan may comprise a dynamic plan that reduces processor power consumption during active workloads such as executing or running a media file using a media application in various embodiments. It should be understood that while affinitization management module 102 is shown as a separate component in computing system 100, it may be included in memory 104, as part of OS 106 or in any other location or configuration and still fall within the described embodiments. Other embodiments are described and claimed.

In some embodiments, affinitization management module 102 may be operative to detect a media application operative to execute on one or more of a plurality of processor cores of a multi-core processor. Examples of media application may include, but are not limited to Windows Media Player, Corel WinDVD, Cyberlink PowerDVD, Arcsoft Total Media Theater, Apple QuickTime and Apple iTunes. In various embodiments, a media application may be executed or run by one or more of a plurality of cores of a multi-core processor in order to render, play, playback or otherwise display, decode or execute a media file. Media files may include, but are not limited to, any combination A/V file having separate audio and video data streams that require synchronization for playback. Media files may include standard definition (SD) media files or HD media files. For example, medial files may include DVD media, HD DVD media, Blue-Ray media, or any other suitable media file. Other embodiments are described and claimed Affinitization management module 102 may be operative to dynamically select a subset of processor cores of the multi-core processor in some embodiments. For example, a multi-core processor may include four physical cores, each have a plurality of logical cores, allowing for eight total available processor cores. In some embodiments, affinitization management module 102 may select a set of these cores for use in executing or running a media application. In various embodiments, the affinitization management module 102 may affinitize the media application to execute on the subset of processor cores. In some embodiments, for example, the subset of processor cores may comprise less than a total number of processor cores of the multi-core processor, for example.

In various embodiments, the affinitization management module 102 may be operative to dynamically and automatically select an optimal number of cores during playback of a media file by a media application. For example, affinitization management module 102 may comprise a script, driver, subroutine, process or other application that is operative to run or execute in the background to determine whether a media application has been launched or is currently active. In some embodiments, affinitization management module 102 may include a predetermined list of media applications to aid in the identification/detection process.

The affinitization management module 102 may include logic to dynamically select the subset of processor cores in some embodiments. For example, the affinitization management module 102 may be operative to affinitize the media application to execute on each of the plurality of processor cores of the multi-core processor. This may establish a benchmark or other suitable measure of total processor utilization or power consumption when each of the plurality of processors cores is utilized. In various embodiments, the affinitization management module 102 may be operative to subsequently measure a power state residency for the multi-core processor. For example, with the media application affinitized to execute on each of the plurality of cores, affinitization management module 102 may determine the utilization or power consumption for the multi-core processor.

In some embodiments, the affinitization management module 102 may be operative to compare the processor performance state (e.g., P0, P1, P2 etc) residency or the processor power state (e.g., C0, C1, C2 etc) residency to a threshold. The threshold may comprise a predetermined amount of power consumption that is acceptable for the multi-core processor. The affinitization management module 102 may be operative to de-affinitize the media application to execute on one less processor core of the multi-core processor if the performance state or power state residency does not exceed the threshold. For example, the affinitization management module 102 may include logic operative to determine that power savings can be achieved by reducing the number of active processor cores.

In various embodiments, the dynamic selection process may be repeated until the processor performance or power state residency does not exceed the threshold. For example, the affinitization management module 102 may be operative to re-measure the power state residency for the multi-core processor after a predetermined period of time, compare the re-measured power state residency to the threshold, and continue to de-affinitize the media application to execute on one less processor core of the multi-core processor if the performance or power state residency does not exceed the threshold. In various embodiments, the affinitization management module 102 may be operative to re-affinitize the media application to execute on one additional processor core of the multi-core processor or maintain a current number of processor cores if the performance or power state residency exceeds the threshold. Other embodiments are described and claimed.

In some embodiments, the affinitization management module 102 may be operative to detect one or more applications operative to execute on one or more of the plurality of processor cores in addition to the media application. For example, a user may launch any number of applications in addition to the media application. In various embodiments, a user may launch a web browser application, for example, while viewing a Blue-Ray DVD movie, which in turn may alter the power requirements and/or consumption of the multi-core processor. In response to the detection, the affinitization management module 102 may decrease a time interval between measurements of the performance or power state residency for the multi-core processor in some embodiments. For example, the affinitization management module 102 may reduce the time interval between performance or power state residency measurements if any additional and/or different types of applications are active. In this way, an optimal number of active cores may be more accurately maintained in view of the altered requirements.

The affinitization management module 102 may be operative to direct media interrupts periodically generated by the media application to synchronize corresponding audio and video data streams of a media file to processor cores of the multi-core processor on which the media application is affinitized to execute in some embodiments. For example, the periodic synchronization interrupts may be directed only to the dynamically selected set of processor cores. In various embodiments, limiting the processor cores involved in processing the synchronization interrupts may result in reduced processor overhead and reduced power consumption for the computing system 100. Other embodiments are described and claimed.

In general, the lower the number of affinitized processor cores, the lower the processor power consumption. In some embodiments, however, the minimum number of processor cores of the multi-core processor affinitized for executing a media application may comprise two processor cores. A reduction to fewer than two active cores may actually increase processor power consumption significantly. For example, use of a single processor core may necessitate the use of a turbo or accelerated mode (or the use of other high performance states, e.g. P1, P2, etc.) for the processor core in order to maintain an adequate level of processing to properly render the media application. The power consumption associated with use of a turbo mode (or other high processor P states) in a single processor core may be insufficient to compensate for the power savings associated with reducing the number of media interrupts.

While certain embodiments are described in terms of a module, logic, software or thread, it should be understood that any number of modules, threads or arrangement of logic and any number of cores of a multi-core processor can be used and still fall within the described embodiments. Furthermore, it should be understood that in some embodiments that logic described herein may be implemented or arranged to perform tasks in parallel, including processing a plurality of tasks or applications and controlling a plurality of cores at substantially the same time. Moreover, it should also be understood that the logic flows described herein depict only examples of logic flows and that different numbers, orders and/or arrangements of the operations described in the logic flows could be implemented and still fall within the described embodiments. Other embodiments are described and claimed.

Figure 2:
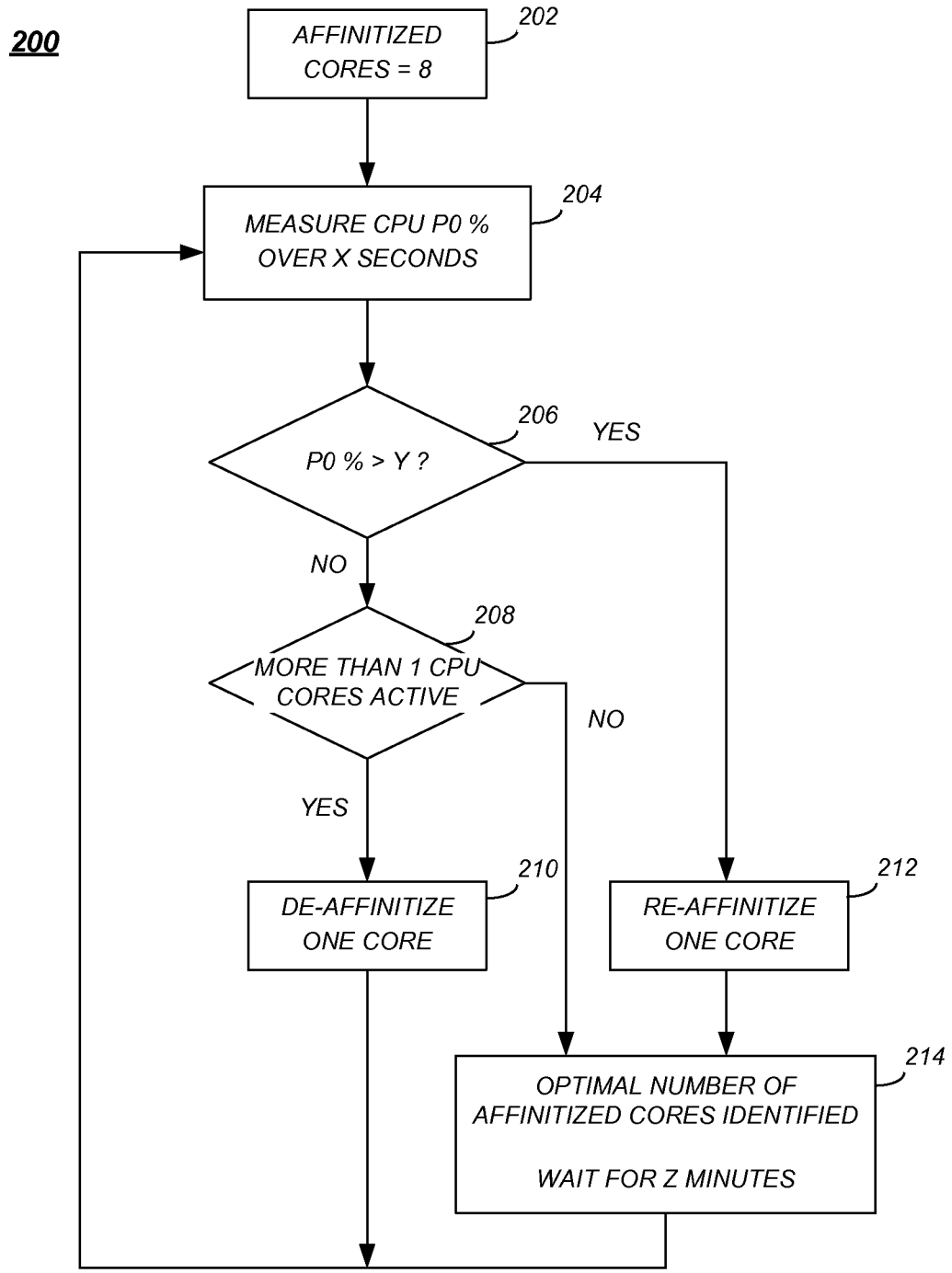
FIG. 2 illustrates one embodiment of a first logic diagram.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe the power saving features described above with reference to apparatus 100 and affinitization management module 102.

In various embodiments, for purposes of illustration and not limitation, the logic flow 200 may assume that an active media application has been identified for a computing system including eight logic cores. In some embodiments, the logic flow 200 may comprise a representation of the logic implemented by the affinitization management module 102 of FIG. 1, for example. Embodiments of the logic flow refer to variables include 'X' 'Y' and 'Z' that may comprise programmable variables capable of being set to different values for different implementations. Other embodiments are described and claimed.

At 202, all available cores of the computing system may be affinitized to execute the media application. For example, as shown in FIG. 2, all eight logical cores may initially be affinitized to execute the media application. In some embodiments, measurements of the processor performance state residency over an evaluation window of X seconds may be made at 204. For example, X may comprise 15 seconds in some embodiments. At 206 a determination may be made as to whether or not the performance state P0 (otherwise known as 'Turbo' state) residency during the last evaluation window X exceeds a Turbo threshold Y. The Turbo threshold Y may comprise a predetermined magnitude or volume of acceptable Turbo processing for the multi-core processor of the computing system, for example.

If the performance state residency does not exceed the threshold Y at 206, a determination is made at 208 whether or not more than one processor core is active. If more than one processor core is active, the media application may be de-affinitized from one processor core at 210 and the process may resume measurements of the performance state residency for the processor at 204. If no more than one processor core is active, a determination may be made at 214 that an optimal number of affinitized cores have been identified and a flag may be set to reflect this determination. Also at 214, a wait period of Z minutes may be established since a last optimal number of affinitized cores was identified before resuming power state residency measurements at 204.

In various embodiments, if the power state residency exceeds the threshold Y at 206, the process may re-affinitize the media application to execute on one additional processor core. The process may then proceed to 214 where a determination may be made that an optimal number of affinitized cores has been identified, a flag may be set to reflect this determination, and the wait period of Z minutes may be established since a last optimal number of affinitized cores was identified before resuming power state residency measurements at 204. The wait period Z may comprise 20 minutes for example. In some embodiments, the wait period may be extended or decreased based on detected system activity. For example, if an application in addition to the media application is detected, the wait period Z may be decreased resulting in more frequent determinations of an optimal number of active processor cores by the affinitization management logic.

Note that while logic flow 200 includes determinations based on a single processor performance state (P0 or Turbo state), other processor performance states (P1, P2, P3 etc.) could be used and still fall within the described embodiments. Also, while the logic flow 200 includes determinations based on processor performance states, it should be understood that other states, such as processor power state or C-states may additionally and/or alternatively be considered and still fall within the described embodiments. For example, de-affinitizing a media application from a number of processor cores may result in executing the application tasks in a more serial manner, which may consequently extend the processor C0 power state, leading to an increase of processor power dissipation, an increase which may exceed any power savings achieved by reducing the processor interrupt rate. Therefore, logic flow 200 may include, in some embodiments, successive core de-affinitization occurring only as long as it does not lead to an increase of processor C0 state which is higher than a pre-determined and/or programmable threshold. Other embodiments are described and claimed.

Figure 3:
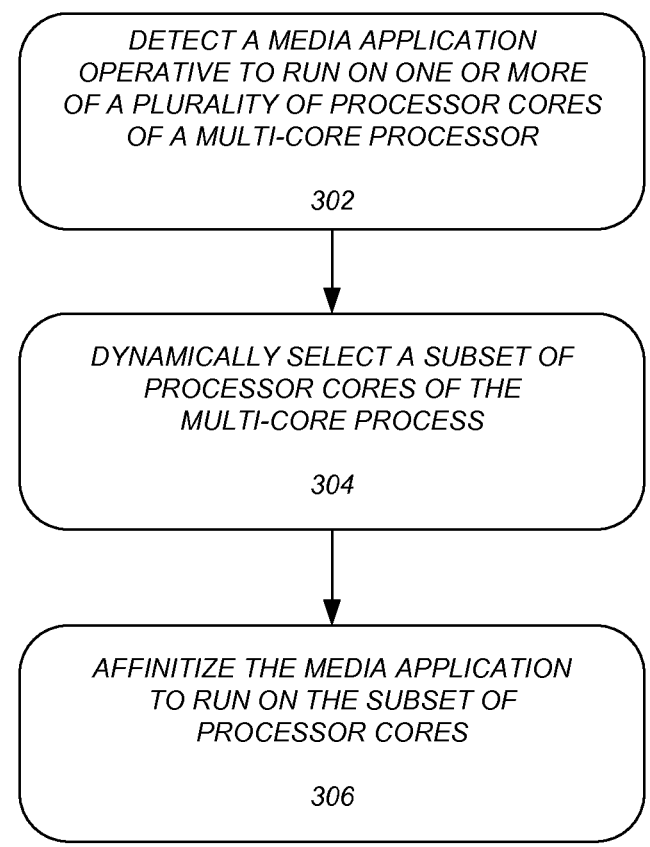
FIG. 3 illustrates one embodiment of a second logic diagram.

FIG. 3 illustrates one embodiment of a second logic flow 300. As described above with reference to logic flow 200, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor).

In one embodiment, a media application operative to execute on one or more of a plurality of processor cores of a multi-core processor may be detected at 302. For example, affinitization management module 102 may detect that Windows Media Player is active on computing system 100 and is operative to execute on any of the processor cores 108-1-*m* of multi-core processor 108. At 304, a subset of processor cores of the multi-core processor may be dynamically selected in various embodiments. For example, affinitization management module 102 may be operative to dynamically select processor cores 108-1 and 108-2 to execute Windows Media Player.

In some embodiments, the media application may be affinitized to execute on the subset of processor cores at 306. For example, affinitization management module 102 may affinitize Windows Media Player to execute on processor cores 108-1 and 108-2 that were dynamically selected. In various embodiments, the subset of processor cores comprises less than a total number of processor cores of the multi-core processor. Processor cores 108-1 and 108-2, for example, comprise only two of the four available processor cores for computing system 100. The minimum number of processor cores of the multi-core processor for executing the media application may comprise two processor cores in some embodiments. For example, affinitization management module 102 may be operative to select no less than two processor cores 108-1-*m* of multi-core processor 108. Other embodiments are described and claimed.

Dynamically selecting a subset of processor cores may comprise affinitizing the media application to execute on each of the plurality of processor cores of the multi-core processor, measuring a performance or power state residency for the multi-core processor, comparing the performance or power state residency to a threshold, and de-affinitizing the media application to execute on one less processor core of the multi-core processor if the power state residency does not exceed the threshold in some embodiments. For example, affinitization management module may be operative to detect that a media application is active, affinitize the media application to execute on each of the processor cores 108-1-*m*, measure a performance or power state residency for the multi-core processor 108, compare the power state residency to a threshold, and de-affinitize the media application to execute on one less processor core (e.g. cores 108-1, 108-2 and 108-3) of the multi-core processor 108 if the power state residency does not exceed the threshold.

In some embodiments, selecting a subset of processor cores may comprise re-measuring the performance or power state residency for the multi-core processor after a predetermined period of time, comparing the re-measured state residency to the threshold, and de-affinitizing the media application to execute on one less processor core of the multi-core processor if the power state residency does not exceed the threshold. For example, the affinitization management module 102 may be operative to periodically repeat the dynamic selection process to confirm or alter if necessary the optimal number of selected processor cores 108-1-*m*.

One or more applications operative to execute on one or more of the plurality of processor cores in addition to the media application may be detected in some embodiments. For example, affinitization management module 102 may detect that word processing application is active in addition to the media application. In various embodiments, in response to the detection, a time interval between measurements of the power state residency for the multi-core processor may be decreased. For example, affinitization management module may decrease the time period between or increase the frequency of performing the steps associated with dynamic selection of an optimal number of processor cores 108-1-*m*.

In some embodiments, the media application may be re-affinitized to execute on one additional processor core of the multi-core processor or a current number of processor cores may be maintained if the performance or power state residency exceeds the threshold. For example, if affinitization management module 102 determines that the performance or power state residency for multi-core processor 108 exceeds the threshold, affinitization management module 102 may re-affinitize the media application to execute on one additional processor core 108-1-*m* that is currently not active.

The media application may be operative to playback a media file having corresponding audio and video data streams in various embodiments. For example, Windvd may be operative to playback a Blue-Ray DVD movie that includes both an audio and video data stream. In some embodiments, the media application may be operative to periodically generate media interrupts to synchronize the audio and video data streams. For example, Windvd may be operative to generate periodic OS 'tick' interrupts used to synchronize the audio and video data streams of the Blue-Ray DVD media file. In various embodiments, the media interrupts may be sent to processor cores of the multi-core processor on which the media application is affinitized to execute. For example, affinitization management module 102 may direct the media interrupts to the subset of processor cores 108-1-$m$ that have been dynamically selected to execute the media application.

While certain embodiments are described with respect to a specific arrangement of processor cores, specific media applications and specific media files, it should be understood that these examples are provided for purposes of illustration and not limitation. Any number, type and/or arrangement of components, modules, application types and file types can be used and still fall within the described embodiments. Other embodiments are described and claimed.

Figure 4:
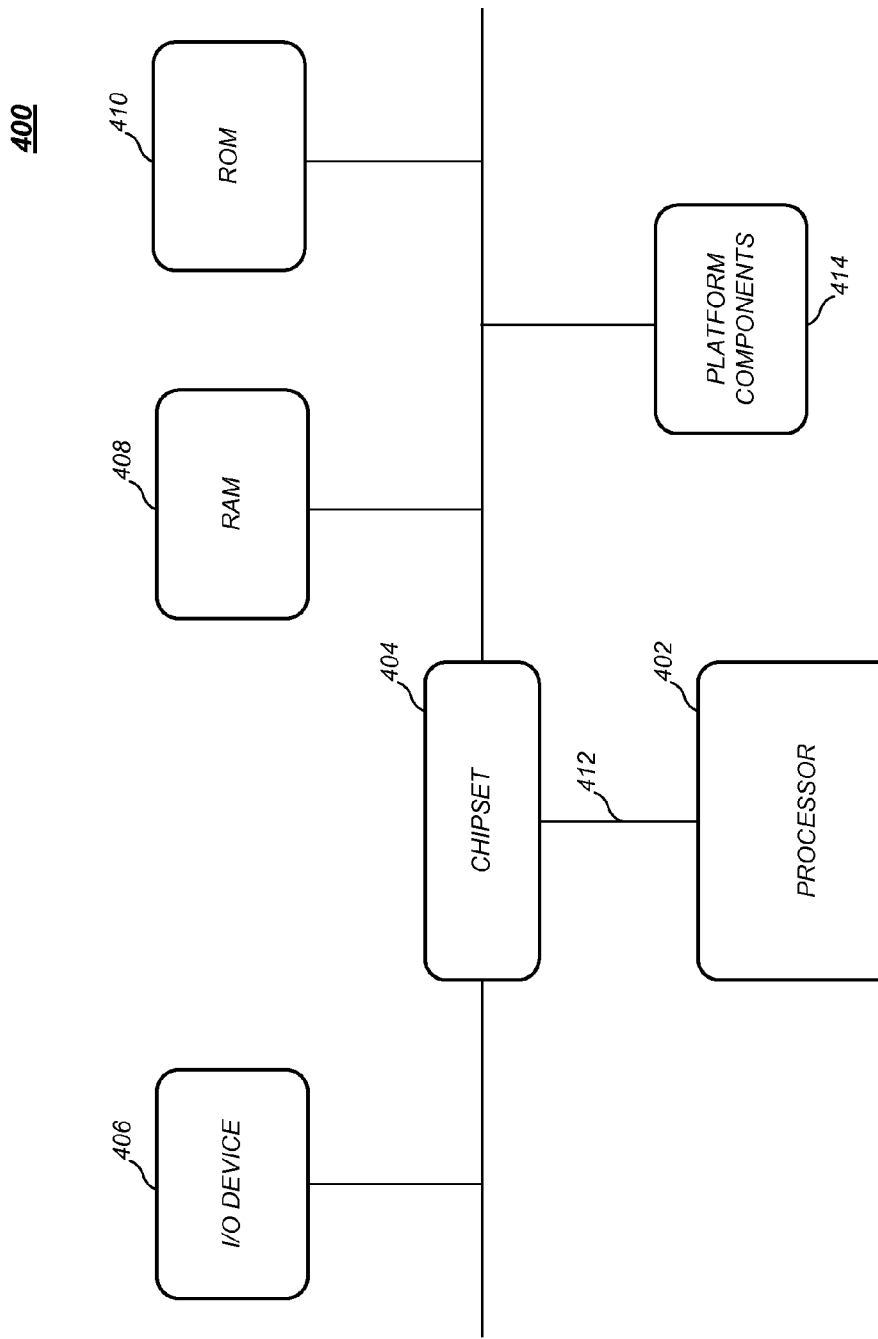
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   detecting a media application operative to execute on a plurality of processor cores of a multi-core processor, the media application comprising an application including a plurality of periodic interrupts, the plurality of periodic interrupts comprising media interrupts utilized by the media application to synchronize corresponding audio and video data streams of a media file;
   selecting a subset of one or more processor cores of the multi-core processor on a dynamic basis, the selecting comprising:
   affinitizing the media application to execute on each of the plurality of processor cores, the affinitizing comprising providing the plurality of periodic interrupts to each of the plurality of processor cores;
   measuring a performance or power state residency for the multi-core processor;
   comparing the performance or power state residency to a threshold;
   de-affinitizing the media application to execute on at least one less processor core, the de-affinitizing comprising providing the plurality of periodic interrupts to at least one less processor core, thereby reducing the power consumption of the multi-core processor if the performance or power state residency does not exceed the threshold; and
   repeating the selecting steps until the performance or power state residency does not exceed the threshold.

2. The method of claim 1, the subset of one or more processor cores comprising less than a total number of processor cores of the multi-core processor.

3. The method of claim 1, selecting a subset of one or more processor cores on a dynamic basis comprising:
   re-measuring the performance or power state residency for the multi-core processor;
   comparing the re-measured performance or power state residency to the threshold; and
   de-affinitizing the media application to execute on at least one less processor core of the multi-core processor if the performance or power state residency does not exceed the threshold, the de-affinitizinq comprising providing the plurality of periodic interrupts to at least one less processor core.

4. The method of claim 3, comprising:
   detecting one or more applications operative to execute on one or more of the plurality of processor cores in addition to the media application; and
   decreasing a time interval between measurements of the performance or power state residency for the multi-core processor.

5. The method of claim 1, comprising:
   re-affinitizing the media application to execute on at least one additional processor core of the multi-core processor if the performance or power state residency exceeds the threshold.

6. The method of claim 1, the media application operative to playback the media file having corresponding audio and video data streams.

7. The method of claim 6, the media application operative to periodically generate the media interrupts to synchronize the audio and video data streams.

8. The method of claim 7, comprising:
   sending the media interrupts to one or more processor cores of the multi-core processor on which the media application is affinitized to execute.

9. The method of claim 1, a minimum number of processor cores of the multi-core processor for executing the media application comprising one processor core.

10. An apparatus, comprising:
    a multi-core processor comprising a plurality of processor cores;
    an affinitization management module operative to execute on the processor to detect a media application comprising an application including a plurality of periodic interrupts, the plurality of periodic interrupts comprising media interrupts utilized by the media application to synchronize corresponding audio and video data streams of a media file, dynamically selecting a subset of one or more processor cores of the multi-core processor, affinitize the media application to execute on each of the plurality of processor cores, the affinitizing comprising providing the plurality of periodic interrupts to each of the plurality of processor cores, measure a performance or power state residency for the multi-core processor, compare the performance or power state residency to a threshold, de-affinitize the media application to execute on at least one less processor core, the de-affinitizing comprising providing the plurality of periodic interrupts to at least one less processor core, thereby reducing the power consumption of the multi-core processor if the performance or power state residency does not exceed the threshold, and repeat the selecting steps until the performance or power state residency does not exceed the threshold.

11. The apparatus of claim 10, the subset of one or more processor cores comprising less than a total number of processor cores of the multi-core processor.

12. The apparatus of claim 10, the affinitization management module operative to re-measure the performance or power state residency for the multi-core processor, compare the re-measured power state residency to the threshold, and de-affinitize the media application to execute on at least one less processor core of the multi-core processor if the power state residency does not exceed the threshold, the de-affinitizinq comprising providing the plurality of periodic interrupts to at least one less processor core.

13. The apparatus of claim 12, the affinitization management module operative to detect one or more applications operative to execute on one or more of the plurality of processor cores in addition to the media application, and decrease a time interval between measurements of the performance or power state residency for the multi-core processor.

14. The apparatus of claim 10, the affinitization management module operative to re-affinitize the media application to execute on at least one additional processor core of the multi-core processor if the power state residency exceeds the threshold.

15. The apparatus of claim 10, the media application operative to playback the media file having the corresponding audio and video data streams.

16. The apparatus of claim 15, the media application operative to periodically generate the media interrupts to synchronize the audio and video data streams.

17. The apparatus of claim 16, the affinitization management module operative to direct the media interrupts to one or more processor cores of the multi-core processor on which the media application is affinitized to execute.

18. The apparatus of claim 10, a minimum number of processor cores of the multi-core processor for executing the media application comprising one processor core.

19. An article comprising a non-transitory computer-readable storage medium containing instructions that if executed by a processor cause a system to:
detect a media application operative to execute on a plurality of processor cores of a multi-core processor, the media application comprising an application including a plurality of periodic interrupts, the plurality of periodic interrupts comprising media interrupts utilized by the media application to synchronize corresponding audio and video data streams of a media file;
selecting a subset of one or more processor cores of the multi-core processor on a dynamic basis, the selecting comprising:
affinitize the media application to execute on each of the plurality of processor cores, the affinitizing comprising providing the plurality of periodic interrupts to each of the plurality of processor cores;
measure a performance or power state residency for the multi-core processor;
compare the performance or power state residency to a threshold;
de-affinitize the media application to execute on at least one less processor core, the de-affinitizing comprising providing the plurality of periodic interrupts to at least one less processor core, thereby reducing the power consumption of the multi-core processor if the performance or power state residency does not exceed the threshold; and
repeat the selecting steps until the performance or power state residency does not exceed the threshold.

20. The article of claim 19, wherein the subset of one or more processor cores comprises less than a total number of processor cores of the multi-core processor.

21. The article of claim 19, comprising instructions that if executed cause the system to:
re-measure the performance or power state residency for the multi-core processor;
compare the re-measured performance or power state residency to the threshold; and
de-affinitize the media application to execute on at least one less processor core of the multi-core processor if the performance or power state residency does not exceed the threshold, the de-affinitizinq comprising providing the plurality of periodic interrupts to at least one less processor core.

22. The article of claim 21, comprising instructions that if executed cause the system to:
detect one or more applications operative to execute on one or more of the plurality of processor cores in addition to the media application; and
decrease a time interval between measurements of the performance or power state residency for the multi-core processor.

23. The article of claim 19, comprising instructions that if executed cause the system to re-affinitize the media application to execute on at least one additional processor core of the multi-core processor if the performance or power state residency exceeds the threshold.

24. The article of claim 19, comprising instructions that if executed cause the system to playback a media file having corresponding audio and video data streams.

25. The article of claim 19, comprising instructions that if executed cause the system to periodically generate media interrupts to synchronize the audio and video data streams.

26. The article of claim 25, comprising instructions that if executed cause the system to send the media interrupts to one or more processor cores of the multi-core processor on which the media application is affinitized to execute.

27. The article of claim 19, a minimum number of processor cores of the multi-core processor for executing the media application comprising one processor core.

* * * * *